Figure 1:
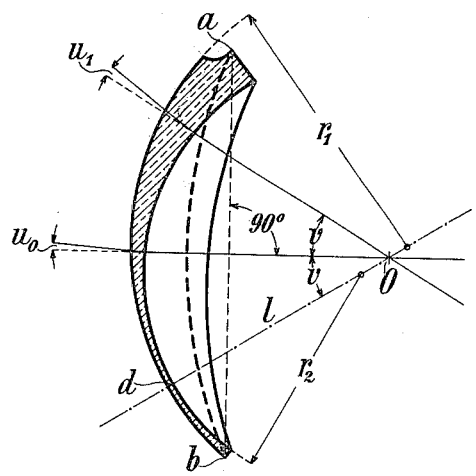

M. VON ROHR.
SPECTACLE GLASS.
APPLICATION FILED AUG. 25, 1910.

1,030,128.

Patented June 18, 1912.

Witnesses:
Paul Krüger
Richard Hahn

Inventor:
Moritz von Rohr

UNITED STATES PATENT OFFICE.

MORITZ von ROHR, OF JENA, GERMANY, ASSIGNOR TO THE FIRM OF CARL ZEISS, OF JENA, GERMANY.

SPECTACLE-GLASS.

1,030,128.  Specification of Letters Patent.  Patented June 18, 1912.

Application filed August 25, 1910. Serial No. 578,861.

*To all whom it may concern:*

Be it known that I, MORITZ VON ROHR, a citizen of the German Empire, residing at Carl-Zeiss strasse, Jena, in the Grand Duchy of Saxe-Weimar, Germany, have invented a new and useful Spectacle-Glass, of which the following is a specification.

The invention relates to spectacle glasses, collective as well as dispersive ones, which are cut out eccentrically for the purpose of obtaining a prismatic effect, which corrects the eye for strabismus. This effect occurs, as is well-known, in the plane which is given on the one hand by the optical axis of the glass, and on the other hand by the center of the latter, which is eccentric to this axis (and through which the principal line of vision passes). The spectacle glasses of this type, used hitherto, have according to the amount of their power more or less astigmatism, even along the principal line of vision. This would still be the case with the slightly curved glasses after Ostwalt, which in their ordinary use, i. e., when cut out concentrically, are anastigmatic even for oblique lines of vision. The above-mentioned defect of eccentrically cut out spectacle glasses is caused by the necessity of so mounting the glass before the eye, that all diameters of its margin—and so also the one that lies in the plane of the prismatic effect—intersect the principal line of vision, which passes through the center of the glass, approximately at right angles. It is the consequence of this unavoidable condition, that the optical axis of the eccentrically cut out spectacle glass comes to lie more or less parallel to the principal line of vision. But the glasses after Ostwalt have their anastigmatic property only under the assumption that the point of intersection of the lines of vision, the point of rotation of the eye, which has a distance of about 3 cm. from the center of the glass, lies in the optical axis. According to the present invention an anastigmatic spectacle glass of a certain kind, which is cut out eccentrically and placed, with a distance of about 3 cm. between its center and the said point of rotation, in the position relative to the principal line of vision as above specified, fulfils the condition that the optical axis passes through the point of rotation of the eye, so that the anastigmatic effect of the glass is turned to account. Beside the two series of astigmatically corrected glasses for collective and dispersive spectacles of various powers, favored by Ostwalt, there are two other analogous series, certainly not in use, but still known. The glasses of these two series differ by a considerably stronger curvature from those of Ostwalt, the power of the convex surface in these glasses amounting to not less than 16, but also not more than 21 dptr. (dioptries). They can be traced back to Wollaston. Each astigmatically corrected spectacle glass of this Wollaston form, because of its strong mean curvature, the center of which coincides approximately with the point of rotation of the eye, retains its anastigmatic property when cut out eccentrically.

Figure 2:
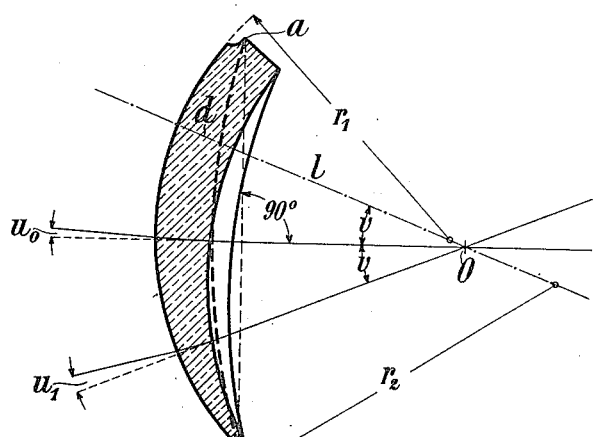

In the annexed drawing: Figure 1 is a horizontal section through a spectacle glass of the Wollaston form, constructed according to the invention. Fig. 2 is a horizontal section through another form of such a glass. Both glasses are corrected astigmatically. They are cut out eccentrically in such a manner as to cause the plane of the prismatic effect to lie horizontally.

The glass shown in Fig. 1 is intended for the correction of a myopic eye. The power in the direction of the optical axis is assumed to be 5 dptr. The refractive index $n_D$ of the kind of glass used is 1.52. The thickness $d$ of the glass in the optical axis is 0.5 mm. The section $l$ of this axis between the glass and the point O, where the lines of vision have to intersect each other, measures 25 mm. Of the two radii of curvature the outer one $r_1$ is 27.5 mm., the inner one $r_2$ 21.7 mm. long. A deflection $u_0$ of the principal line of vision (which passes through the center of the glass and intersects the optical axis in O) of 3.4° or 6 ctrd. (centrad) was to be obtained. For this purpose the optical axis had to receive an inclination $v$ of 30.7° relatively to the principal line of vision. Another line of vision, inclined by $2\,v$ relatively to the optical axis, would then experience a deflection $u_1$ of 5.8°. The horizontal diameter of the edge, by which the glass is intended to be mounted, is shown as a dotted line $a\,b$. It intersects the principal line of vision at right angles.

The spectacle glass according to Fig. 2 is collective and is intended to serve for the correction of a hypermetropic eye. The power in the axis is assumed to be 4 dptr. The refractive index $n_D$ is again 1.52. The thickness $d$ is 6.0, the distance $l$ again 25 mm. The outer radius $r_1$ has a length of 29.4, the inner one $r_2$ of 34.7 mm. The deflection $u_0$ of the principal line of vision was again to be 6 ctrd. By this means $v$ has received the value 21.3° and $u_1$ the value 6.6°.

I claim:

An astigmatically corrected spectacle glass, having a convex front surface and a concave hinder surface and cut out eccentrically for obtaining prismatic effect, the power of the convex surface amounting to not less than 16 and not more than 21 dptr.

MORITZ von ROHR.

Witnesses:
 PAUL KRÜGER,
 ALFRED MECKEDANZ.